Feb. 21, 1967     D. B. SCOTT     3,304,814

DRILLING APPARATUS

Filed Feb. 3, 1964     8 Sheets-Sheet 1

INVENTOR.
DAVID B. SCOTT
BY
ATTORNEY

Feb. 21, 1967  D. B. SCOTT  3,304,814
DRILLING APPARATUS

Filed Feb. 3, 1964

INVENTOR
DAVID B. SCOTT
BY *Richard D. Stephens*
ATTORNEY

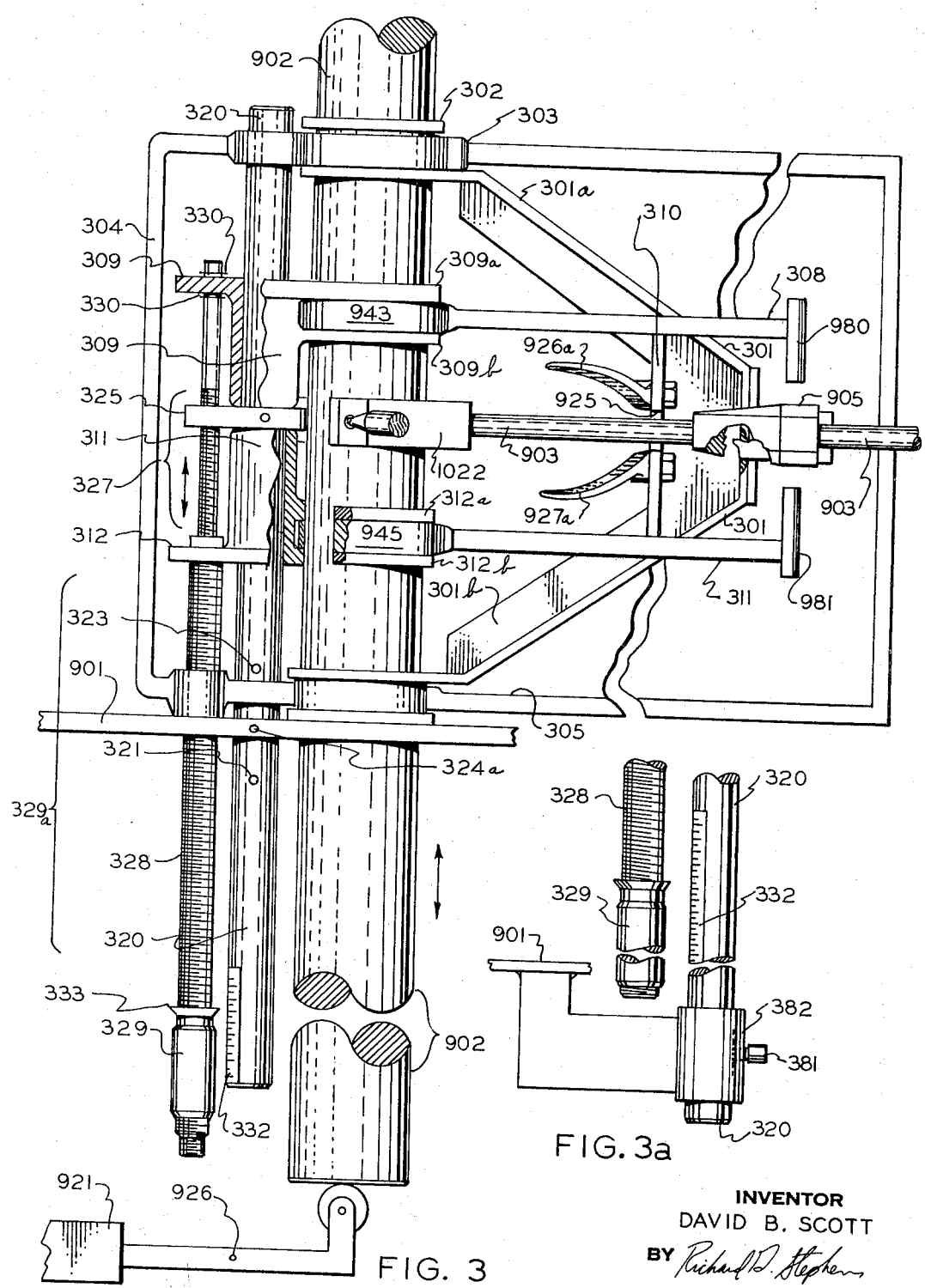

INVENTOR.
DAVID B. SCOTT
BY Richard D. Stephens
ATTORNEY

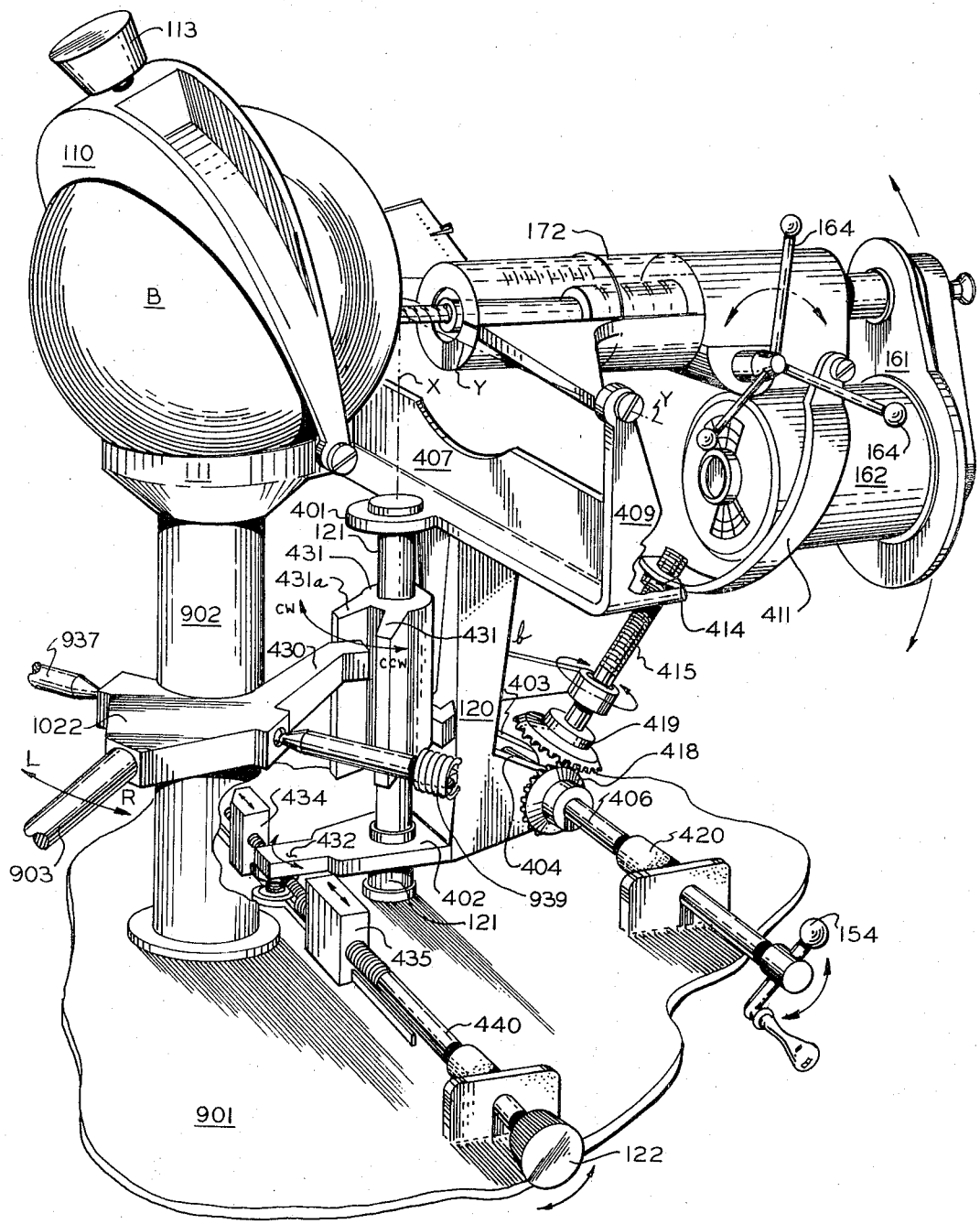

Feb. 21, 1967　　　D. B. SCOTT　　　3,304,814
DRILLING APPARATUS
Filed Feb. 5, 1964　　　　　　　　　　　　　　8 Sheets-Sheet 8

INVENTOR
DAVID B. SCOTT
BY Richard G. Stephens
ATTORNEY

United States Patent Office 3,304,814
Patented Feb. 21, 1967

3,304,814
DRILLING APPARATUS
David B. Scott, 53 Liberty St., Walton, N.Y. 13856
Filed Feb. 3, 1964, Ser. No. 341,850
12 Claims. (Cl. 77—31)

This application is a continuation-in-part and improvement of my copending application Serial No. 177,439 filed March 5, 1962, for "Ball Drilling Apparatus," now abandoned. Most bowling balls are drilled to suit a particular bowler's physical requirements, and usually drilled by a local bowling establishment proprietor or sporting goods dealer to a customer's specific order. Since these proprietors rarely are highly-skilled machinists, and because rather complex geometry can be involved, proper and accurate drilling of proper size thumb and finger holes in desired locations at desired pitch angles has been tedious and time-consuming, and frequently has resulted in errors. Proper drilling of a bowling ball is complicated by the fact that the desired distances between holes usually are specified in special "great circle" or ball surface hole edge-to-hole edge dimensions. When a bowler grips a ball his fingers and thumb grip the inside edges of the holes, i.e., the finger hole edges nearest the thumb hole and the thumb hole edge nearest the finger holes, and the locations of the outer edges of the holes are all relatively unimportant. The position of a drill bit relative to the ball, however, must be established in accordance with drill centers, and the requirement that plural different hole sizes be used has prevented use of any simple means for an operator to take both a desired hole spacing distance and a hole size into account Because hole edge-to-hole edge distances are of primary interest, such distances are determined when "fitting" a ball for a customer, by adjusting one of several known types of "measuring balls," which are adjustable gauges adapted to receive the customer's hand and indicate proper hole spacing dimensions. The measurement data read from the measuring ball commonly is given in hole edge-to-hole edge form for the reasons stated above. Proper drilling of a bowling ball is further complicated by the fact that the holes to be drilled must be located properly in two coordinates, and also located properly with respect to a reference radius of the ball, to insure that the ball will be balanced after the holes are drilled. Bowling balls are intentionally weighted on one side during manufacture by insertion of a plug of heavier material. After manufacture the ball is floated in a mercury pool or the like and a mark made on the ball to indicate the radial direction between the center of the ball and the centroid of the extra weight in the ball. Then later, if the holes to be drilled are properly established with respect to the weight radius line, the removal of material resulting from drilling the holes will result in the ball being approximately balanced. Because rather small amounts of unbalance will disqualify a ball from authorized use in any regulation competition, it is important that all of the holes be drilled properly located with respect to the weight radius line. The manufacturer marks the weighted side of the ball with an index or reference mark, often in combination with the manufacturer's trademark, to indicate the heavy side of the ball later to the driller. While the ball center and the centroid of the weight plug determine a reference line, the reference marks applied by the manufacturer are two-dimensional, thereby establishing a reference plane through the ball. The thumb hole usually is drilled centered on this plane, while the finger holes usually are drilled approximately equidistantly spaced on opposite sides of the plane, each at one-half of the "web" distance from the reference plane to the near edge of a finger hole.

My above-mentioned copending application discloses several forms of improved ball drilling apparatus into which an unskilled operator can set the conventional hole spacing and size information in its usual form, without any need to convert the information nor to inscribe lines or other guide marks on the ball, and by means of which an unskilled operator can easily manipulate relatively the ball and drill so as to drill the desired holes in their proper locations.

In the preferred embodiment shown in the above-mentioned application, the "span" distances, i.e., the distance between one edge of the thumb hole and one edge of each of the two finger holes, is determined by the setting of three cam means, each cam means serving to position an associated stop means, so that a ball being drilled may be turned about its center from a reference position with respect to a stationary drill, until the stop means operate, at which times the ball will be correctly positioned to drill the holes in the ball at desired "span" distances. In that embodiment of the invention, the "web" distance between a pair of adjacent finger holes may be determined by independent adjustment of two controls against two scales to position a pair of further stops which limit upward and downward translation of the ball from a "zero web" reference position. While such an arrangement offers many advantages over its predecessors, and while it is eminently satisfactory for most drilling operations, since very many balls use a "standard" or uniform "web" dimension, the fact that two independent adjustments are required to determine the web dimension sometimes confuses an unskilled operator, resulting in inaccurate or faulty "web" distances in balls being drilled. Unless the operator is careful to adjust both of the two web dimension indicators of the previous device to the same setting, the finger holes will not be centered equally on opposite sides of the ball reference plane.

As mentioned above, the pair of finger holes usually are placed equidistantly on opposite sides of the reference plane and the thumb hole itself centered on the reference plane. However, some bowlers prefer modified arrangements, one of which is known as a "Collier's grip," wherein one finger hole is centered on or about the reference plane, and the other finger hole is substantially offset from the reference plane. If scales on the two independent web adjustment indicators are marked for usual "centered-web" drilling, they are not usable for "Collier's grip" drilling, and a plurality of different scales must be provided. The use of plural adjustments and plural scales greatly increases the chance of operator error, particularly when it is considered that both "left-hand" and "right-hand" balls must be drilled. As well as Collier's grip hole spacing, various other offset hole patterns or configurations are sometimes desired.

While adjustments of the machine shown in my copending application to accommodate such variations from standard drilling are perhaps not beyond the skill of an expert machinist, nor perhaps not beyond that of an operator who operates the machine many hours each day, they frequently are clearly beyond the skill of, or at least very time-consuming for the ordinary bowling alley proprietor or sporting goods clerk, and hence it becomes desirable to provide a modified drilling machine in which a very unskilled operator may drill modified "web" distances, and "Collier's grip" balls and various other modified hole patterns easily with minimum trouble and minimum chance for error. In the present invention a single control means is provided to position both web translation stops by a means which insures that both stops are moved equally (although they must be moved in opposite directions) from a reference "zero web" center position, and means are provided which allow quick and easy adjustment to provide "Collier's grip" drilling wherein one of the finger holes is located on the ball reference plane.

As is well known, the "pitch" of a hole is the angle between a hole axis and a ball radius which passes through the hole center at the ball surface. Thumb holes usually are given either forward or reverse pitch, as the bowler desires, to facilitate gripping and ball control by the bowler. Finger holes also are frequently drilled with either forward pitch or reverse pitch. Forward and reverse pitch may be measured by projecting each hole axis onto the reference plane of the ball. If the axis of both the thumb hole and the finger holes pass directly through the ball center, the holes are said to have "zero" pitch. If the thumb hole drilling axis is directed toward the finger-hole side of the ball center, or if a finger hole axis is directed toward the thumb-hole side of the ball center, such a hole is said to have "forward pitch." Conversely, if a thumb hole axis is directed away from the finger hole side of the ball center, or if the finger hole axis is directed away from the thumb hole side of the ball center, the given hole will have "reverse pitch." In the apparatus of my copending application, any desired pitch angle may be provided. Since finger holes are located substantially around the periphery of a ball from its thumb hole, and since the pitch angle of a thumb hole is determined in opposite sense from the pitch angle of finger holes, it will become apparent that in a device wherein a movable drill carriage determines hole pitch, the drill carriage must be swung in an opposite direction for finger holes than that direction used for drilling the thumb hole. While pivoting the drill carriage to provide the desired pitch may be easily accomplished in the device of my prior application, it is possible for an unskilled operator to forget to change the drill carriage position when changing from thumb hole drilling to finger hole drilling, and thereby possible for the operator to ruin the ball. A further feature of the present invention is the incorporation of automatic means to change drill carriage position when the operator changes from thumb-hole drilling to finger-hole drilling, so that a proper pitch angle will be obtained even if the operator has forgotten to make such an adjustment. In the present invention, the automatic pitch angle adjusting mechanism operates automatically to adjust the drill carriage to one of two opposite penetration or pitch angles, depending upon whether the operator has rotated the ball in one direction from a reference position to drill the thumb hole or in the opposite direction to drill finger holes. While many bowling balls are drilled with "standard" pitch angles, it is highly desirable that a drilling machine be able to provide many non-standard pitch angles, and hence it is desirable that the automatic pitch angle changing mechanism be capable of being "over powered" or otherwise stated, that pitch angle be capable of being changed for any hole, in order that non-standard pitch angles may be drilled easily. Thus it is a further object of the invention to provide an improved ball-drilling apparatus which automatically shifts the drill carriage relative to the ball to provide proper pitch angles, and which apparatus is nevertheless easily adjustable for the drilling of non-standard pitch angles.

Other objects of the invention will in part be obvious and will in part appear hereinafter.

The invention accordingly comprises the features of construction, combinations of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 3 is an elevation view illustrating an improved web shift assembly portion of a ball drilling machine according to the present invention; and FIG. 3a illustrates an optional modification to a portion of the apparatus of FIG. 3;

FIG. 5 is a perspective view illustrating principally the drill carriage and automatic pitch angle adjusting mechanism of the present invention.

Figure 1:
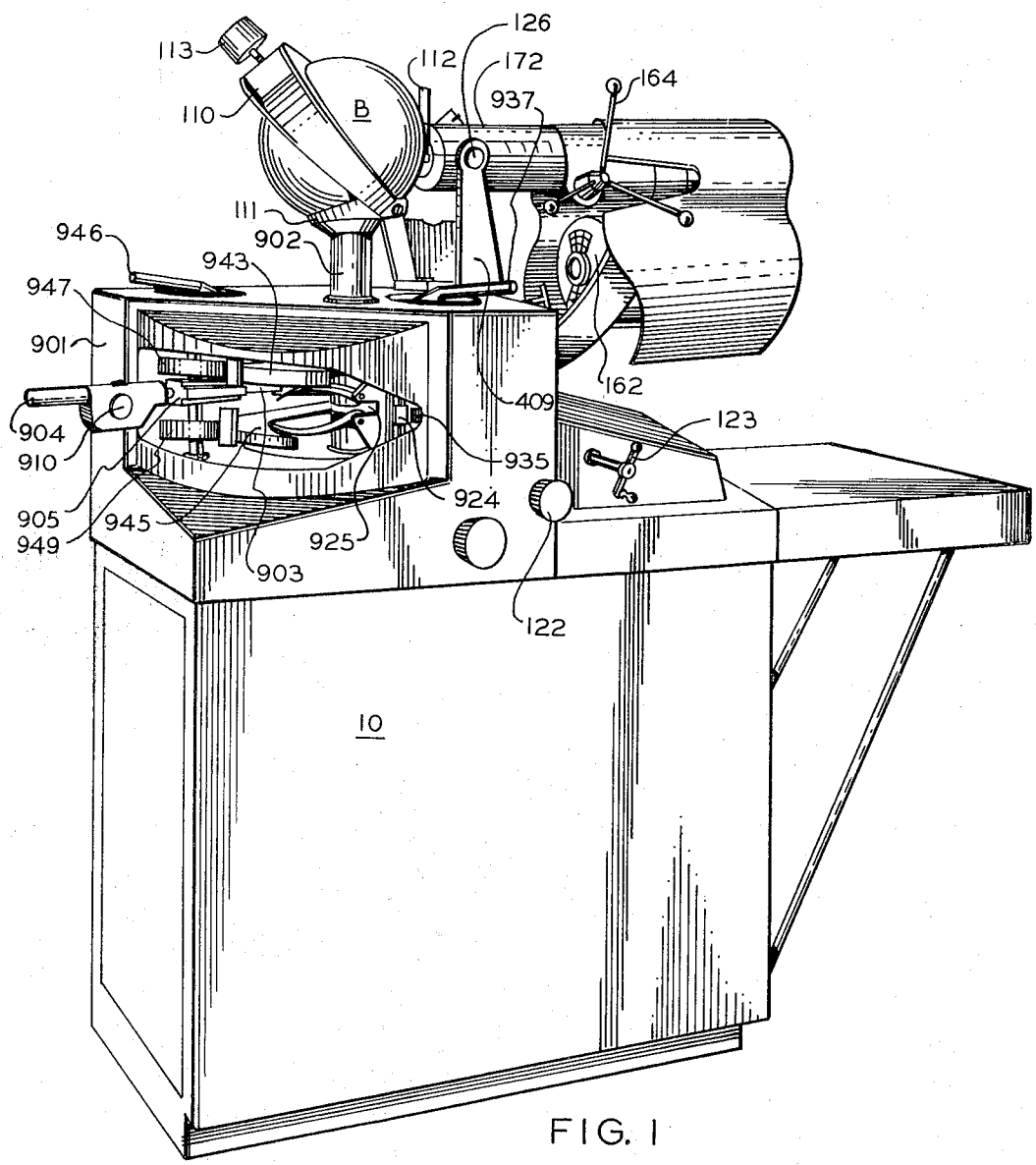
FIG. 1 is a perspective view illustrating the general arrangement of a ball-drilling apparatus constructed in accordance with the invention.

Referring now to the general arrangement shown in FIG. 1, the ball drilling apparatus is shown mounted upon a base cabinet 10. A bowling ball B to be drilled is seated in a concave seat 111 and held in place on seat 111 by means of ball clamp 110, rotation of clamp knob 113 threaded in clamp yoke 110 serving to hold ball B fixedly in the ball clamp 110. The ball clamp assembly is mounted atop a rotatable and vertically translatable main ball shaft 902. Ball B is placed on concave seat 111 so that an index mark on ball B is aligned with cross-hairs inscribed on transparent plastic guide 112, which is carried on seat 111, and then clamp knob 113 is tightened, thereafter to hold ball B in place during the drilling of all holes. By rightward-leftward motion of control handle 904, main ball shaft 902 (and ball B) are rotated about the axis of shaft 902, and by up and down movement of handle 904, main ball shaft 902 (and ball B) are translated vertically, both rotational and vertical translation serving to position ball B with respect to a drill carriage assembly. The drill carriage assembly is mounted for pivotal adjustment about an axis tangent to the periphery of ball B under control of forward-reverse pitch control knob 122, thereby determining the angle of drill penetration in one dimension, thereby to determine the "forward-reverse pitch" of the holes drilled. Adjustment of side pitch control crank 123 serves to pivot the drill carriage assembly about pivot 126, thereby determining the angle of drill penetration in a second perpendicular direction.

The desired span distance between the thumb hole and the No. 1 finger hole is determined by adjustment of control pointer 937, and the desired span distance between the thumb hole and the No. 2 finger hole is determined by adjustment of control pointer 946, each of the control pointers serving to position cams which operate as stops to limit the motion of control handle 904 (and ball B) in a manner to be described below. Hole size dial knob 910 serves to position tapered cam block 905 on a rigid shaft 903 which extends between handle 904 and main ball shaft 902, thereby varying the distances by which shaft 902 and ball B may be rotated and translated, and thereby automatically compensating the desired span and web dimensions in accordance with desired hole sizes.

Figure 2A:
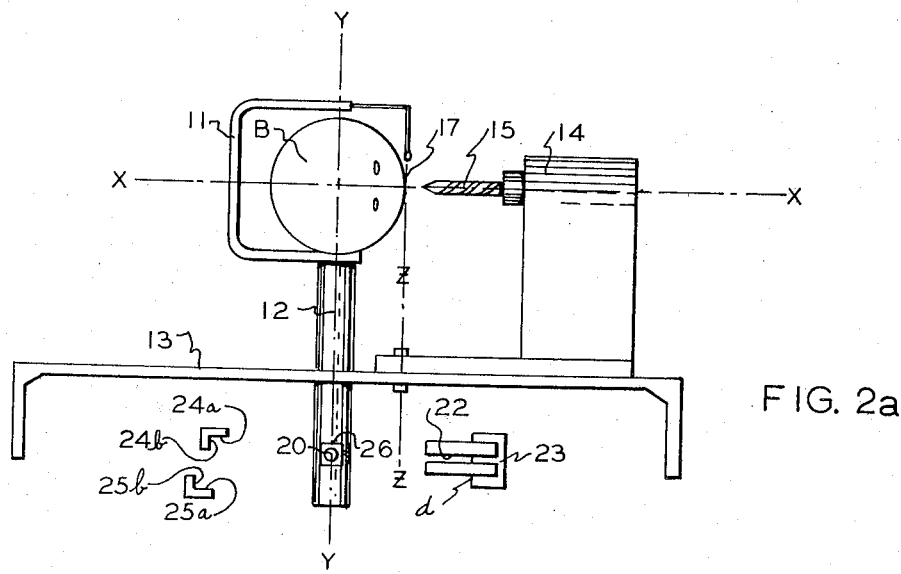
FIGS. 2a and 2b are elevation and plan views in simplified and highly schematic form illustrating the basic principles of operation of the ball-drilling machine to be described.
Figure 2B:
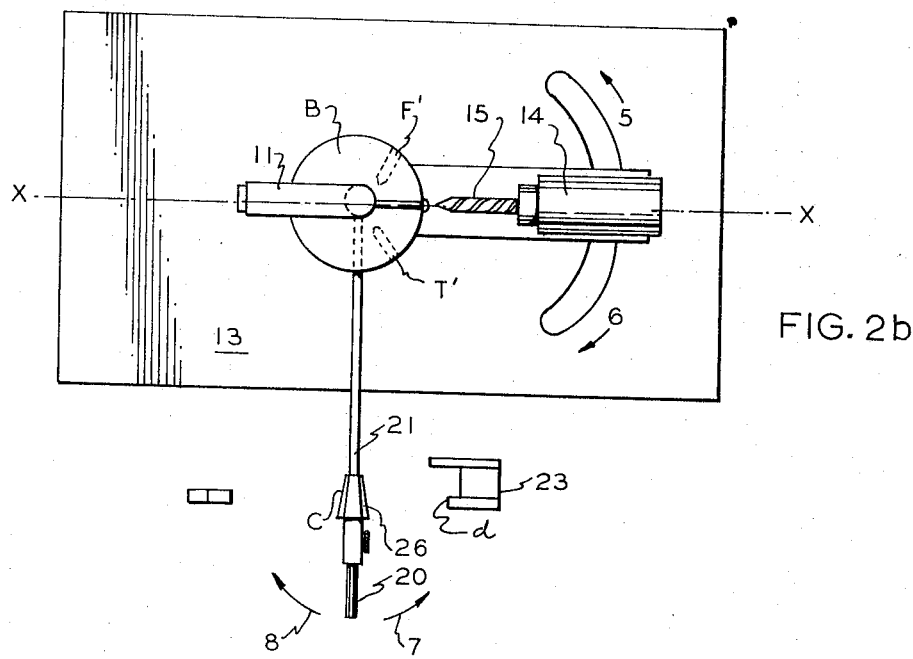

The operation of the basic apparatus to which the invention especially pertains may be readily understood by reference to the greatly simplified diagrams of FIGS. 2a and 2b, which illustrate background principles helpful to an understanding of the present invention.

In FIGS. 2a and 2b a bowling ball B is shown fixedly mounted in a ball-support means 11 which in turn is rigidly carried on the upper end of a rotatable and translatable main shaft 12, which is rotatably and slidably carried in the machine base 13. A drill carriage 14 carries a powered drill tool 15 which may be advanced and retracted to and from ball B to drill the thumb and finger holes. Ball B is initially placed in ball-support 11 so that the manufacturer's reference mark on the ball is aligned with cross hairs on an index window 17 carried on ball support 11, the ball is then clamped in support 11, and the ball thereafter is maintained in the same position relative to ball support 11, as the ball is successively positioned to three different orientations to drill the three desired holes. The ball is positioned properly with respect to drill carriage 14 and drill tool 15 by rotating and translating main shaft 12, ball support 11 and ball B, the limits of rotation and translation being defined by the positions of three adjustable stop means 23, 24 and 25, all of which are shown floating in FIGS. 2a and 2b merely for sake of clarity. To drill the ball thumb hole T, which is located on the ball reference plane, handle 20, which is rigidly attached to main shaft 12, is moved rightwardly as indicated by arrow 7 in FIG. 2b, so that shaft 21 nests in slot 22 of thumb stop 23 and eventually face c of tapered cam block 26 strikes edge d of thumb stop 23. Slot 22 is vertically located with respect to the base 13 and drill carriage 14 so that adjustment of shaft 21 into slot 22 insures proper vertical positioning of ball B for the thumb hole to be drilled precisely on the ball reference plane. Thumb stop 23 is made angularly adjustable around main shaft 12 and angularly located by means (not shown in FIGS. 2a and 2b) for setting the angular position of stop 23 in accordance with a desired span dimension. When shaft 21 is nested in slot 22 of stop 23, point T' on ball B will be situated opposite the tip of drill 15, so that the thumb hole shown in dashed lines in FIG. 2b will be drilled in ball B as the drill is advanced. In order to drill one finger hole, handle 20 is moved leftwardly as indicated by arrow 8 in FIG. 2b, until two faces of tapered cam block 26 rest against faces 24a, 24b of adjustable finger stop 24, thereby determining the upper limit of translation and the clockwise limit of rotation of the ball. To drill the other finger hole, handle 20 is moved to rest tapered cam block 26 against faces 25a and 25b of finger stop 25, thereby determining the lower limit of translation and a different (usually) clockwise limit of rotation. To rest block 26 against face 24a, it will be seen that handle 20 (and consequently ball B) must be lifted from the position shown so that the ball is lifted with respect to drill 15, and hence the finger hole will be drilled below the ball reference plane, and conversely, the moving of handle 20 down to strike stop 25a will position the ball to drill the other finger hole above the reference plane of the ball. Finger stops 24 and 25 are also made angularly adjustable about shaft 12 (by means not shown) to establish clockwise limits of rotation of the ball and thereby establish desired finger span dimensions. Tapered cam block 26 is made adjustably reciprocable on shaft 21 in accordance with desired finger hole sizes, so that the proper web distance between finger holes and the proper span distances between the thumb hole and each of the finger holes are properly established while automatically taking finger hole size into account. Adjustment of tapered cam block 26 inwardly and outwardly on shaft 21 will be seen to govern the amount which handle 20 must be rotated and translated in order for the faces of cam block 26 to strike the stops. Thus the angular positioning of stops 23, 24 and 25 about the axis of main shaft 12 and the positioning of reciprocable cam block 26 will be seen to determine thumb-to-finger hole "span" dimensions, while the vertical positioning of stops 24 and 25, and the positioning of reciprocable cam block 26 will be seen to determine the finger hole edge-to-finger hole edge or "web" dimension. In an actual embodiment of the invention, it will be understood that stops 23, 24 and 25 are positioned by means of cams and the like to proper angular and vertical positions by means of input dials and cranks or the like into which the desired "order information" (i.e., the span, web and hole size information) is set. As shown in my previous application, main shaft 12 may be counter-weighted and provided with spring systems to hold cam block 26, handle 20, and hence the ball support and ball against the stops while the ball is being drilled.

With drill carriage 14 set in the position shown, it will be seen that the axis of any hole drilled would, when projected on the reference plane, pass through the center of the ball, i.e., would have "zero pitch." In order to provide desired pitch angles, drill carriage 14 is mounted to pivot about axis Z—Z, which axis is tangent to any standard diameter bowling ball. If carriage 14 is swung anti-clockwise (as indicated by arrow 5 in FIG. 2b), it will be seen that the hole being drilled would have forward pitch, as shown. However, in order to provide forward pitch in the thumb hole T', it will be seen that drill carriage 14 must be swung in the opposite direction, (in the direction indicated by arrow 6) when the thumb hole T' is being drilled. Thus when the operator moves handle 20 leftwardly in FIG. 2b to properly position the ball for the drilling of a finger hole, he must remember, in the absence of the present invention, to swing drill carriage from its clockwise position to an anti-clockwise position.

The web distance between the finger holes is established by the vertical positions of faces 24a and 25a of stops 24 and 25. To decrease web distance, stops 24 and 25 are moved vertically toward each other, and since the finger holes normally are equidistant from the ball reference plane, it is necessary that stops 24 and 25 be moved equal distances but in opposite directions relative to the reference plane when a varied web dimension is desired.

If variable "side pitch" is to be provided, drill carriage 14 must be mounted in a more complex manner than that shown in FIG. 2a, so that drill carriage 14 may be pivotally adjusted about an axis which is both located at the intersection of axes X and Z in FIG. 2a and perpendicular to axes X and Z. Such side pitch adjustment is incorporated in the actual apparatus to be illustrated.

Figure 4:
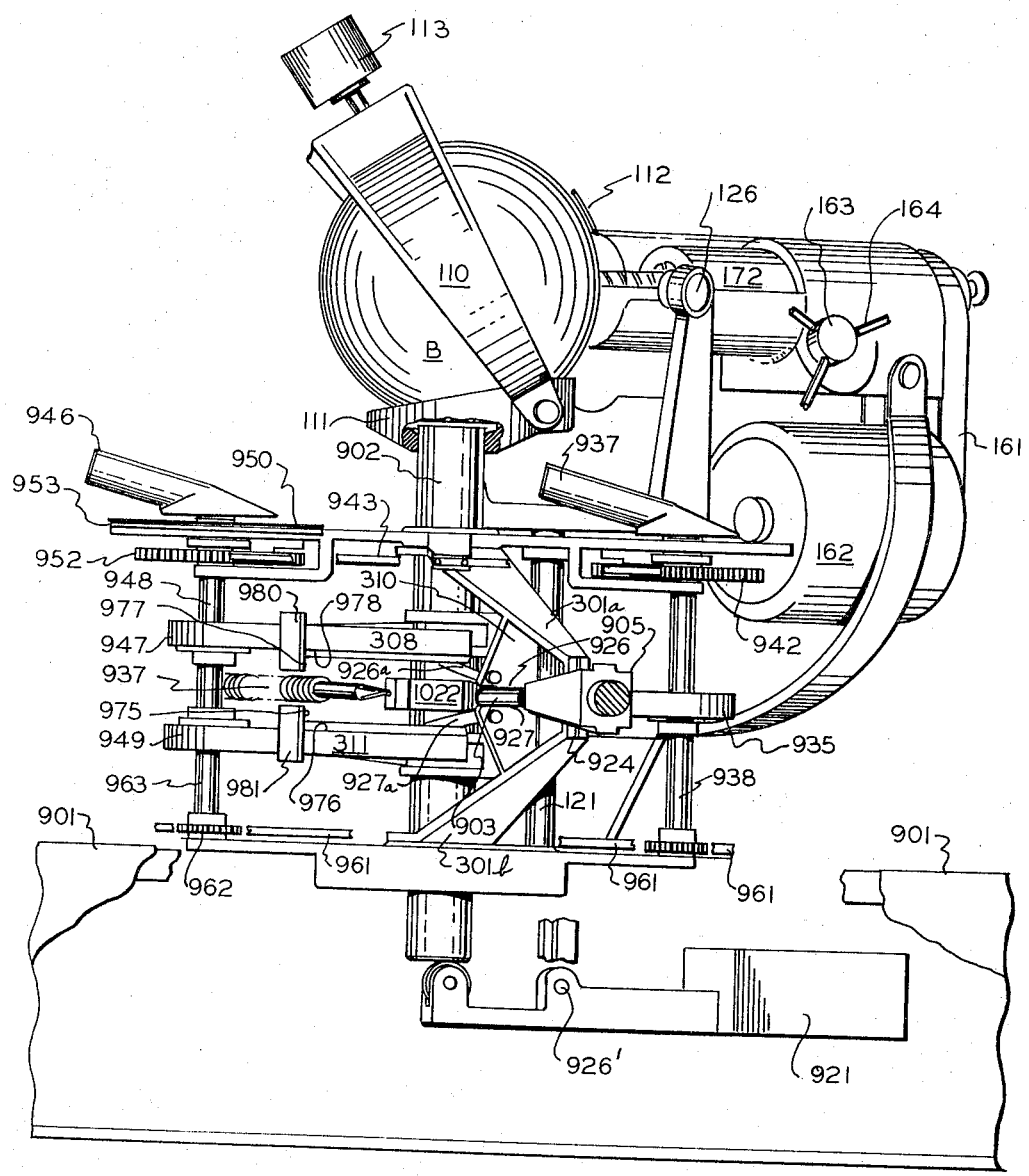
FIG. 4 is an elevation view of the general arrangement of the invention.
Figure 6:
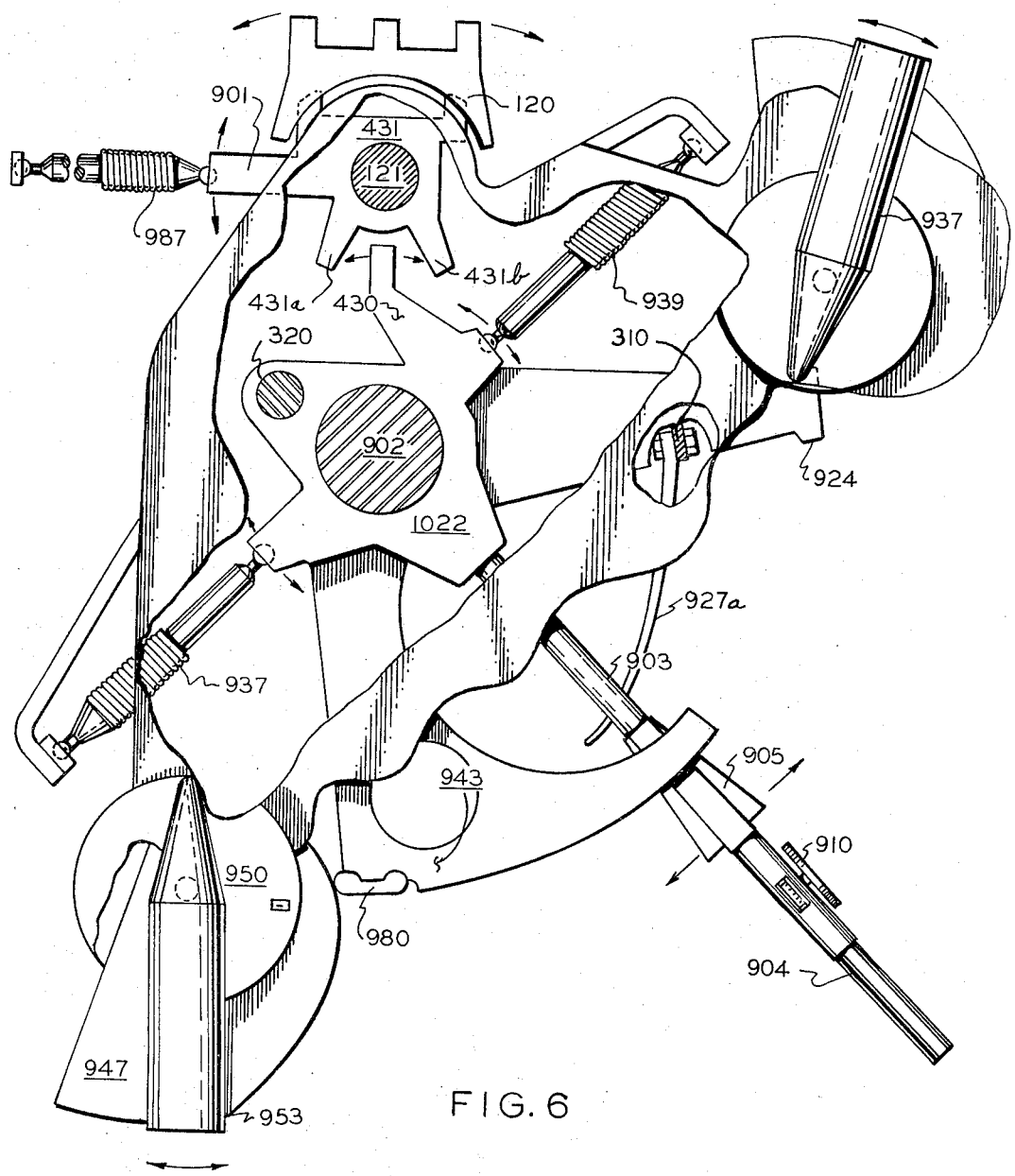
FIG. 6 is a plan view of a portion of the automatic pitch angle adjusting mechanism of the invention.
Figure 7:
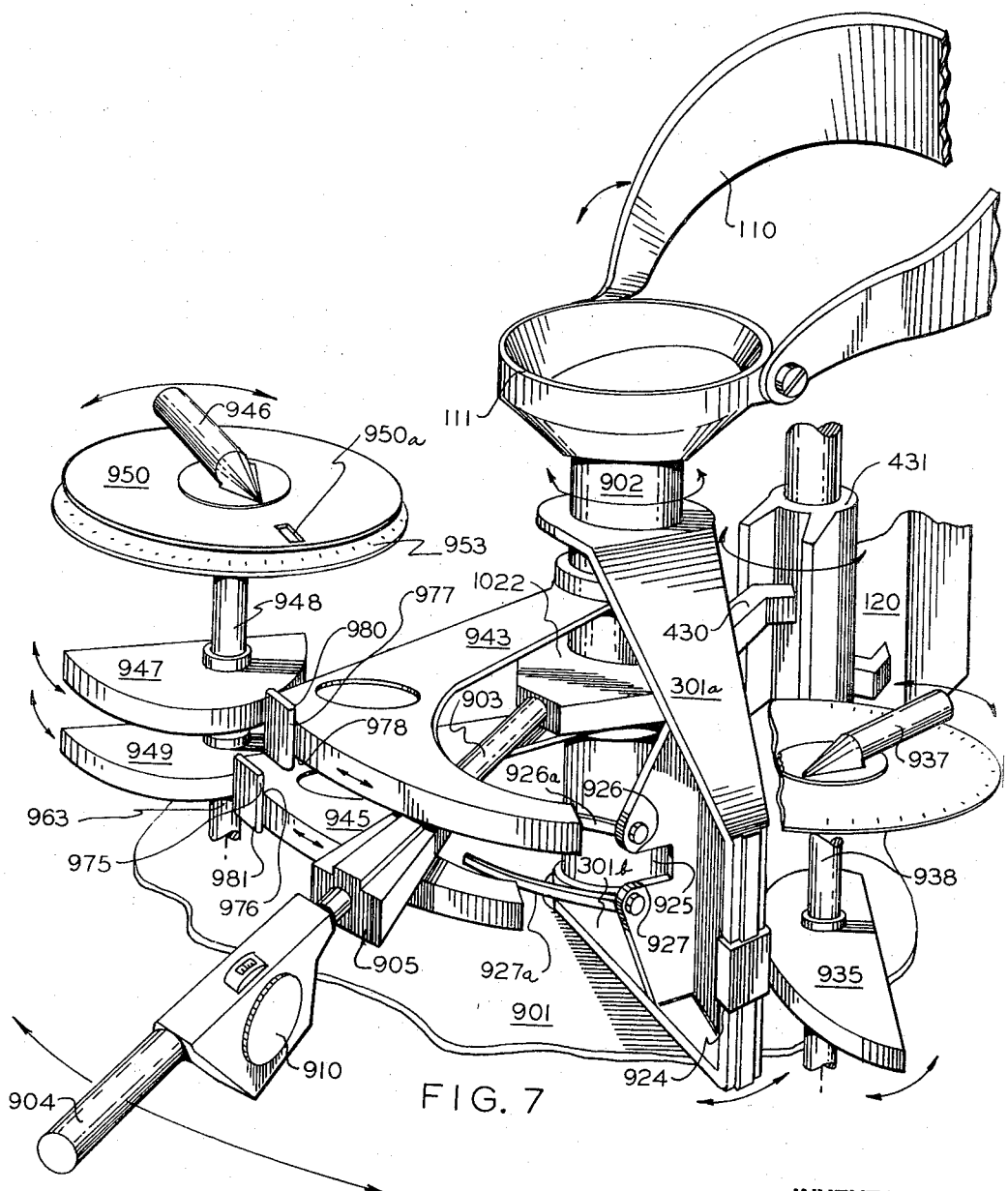
FIG. 7 is a perspective view taken from another angle to more clearly illustrate portions of the apparatus.

The general arrangement of the apparatus will become more apparent from reference to FIGS. 4 and 7 from which many parts have been omitted for sake of clarity. Bowling ball B is shown carried in a concave seat 111 and held fixedly clamped therein by ball clamp 110. A transparent guide 112 (FIG. 4) carried on seat 111 carries cross-hairs against which the manufacturer's reference mark may be aligned when the ball is set in seat 111, and the ball is clamped so that the reference plane is horizontal, perpendicular in two dimensions to the axis of shaft 902. Seat 111 is fixedly carried on the upper end of main shaft 902, which is both slidably and rotatably journalled in bearings fixedly mounted with respect to the stationary machine base 901. The weight of ball B is approximately compensated for by counterweight 921 (FIG. 4) which is pivotally carried on pivot 926' which is journalled in the machine base. A pair of opposing springs 937, 939 only one (937) of which is shown in FIG. 4, act on collar 1022, which is fixedly attached to shaft 902, thereby tending to hold shaft 902 in the limit translational and rotational positions to which it is manipulated. Both spring means are shown in FIGS. 5 and 6.

Both rotation of shaft 902 to establish span dimensions and vertical translation of shaft 902 to adjust the desired web dimension, are accomplished by movement of rigid rod 903, which extends inwardly from handle 904 and which is screwed fixedly into collar 1022 and main shaft 902. For clarity, the outer end of shaft 903, which carries handle 904, has been omitted in FIG. 4. Vertical movement of handle 904 and rod 903 moves main shaft 902 vertically, and left-right movement of handle 904 and rod 903 rotates shaft 902 about its axis. Tapered cam follower block 905 is adjustably translated along rod 903 by means of a "Hole Size" dial 910 (not shown in FIG. 4). Block 905 is tapered both horizontally and vertically, and has the shape of a truncated pyramid.

Adjustment of shaft 902 (and hence the ball support and ball) to a "zero web" vertical position and to the desired span position for drilling the thumb hole is accomplished by moving shaft 903 to the right as viewed in FIGS. 4 and 7, so that a face of block 905 rests against the surface of stop pad 924, and so that shaft 903 nests in a slot 925 (see FIG. 7) between projections 926, 927 of vertical plate 310. A pair of upper and lower curved guides 926a and 927a fixedly fastened to plate 310 and arranged to converge toward slot 925 serve to guide shaft 903 into the slot between 926 and 927 as shaft 903 is moved rightwardly. Rotatable thumb stop casting 301 includes upper 301a and lower 301b arms which both extend into and surround main shaft 902 so that casting 301 is rotatable about shaft 902, as clearly seen in FIGS. 3 and 7. Vertical plate 310 is welded to and extends between the upper (301a) and lower (301b) arms of rotatable thumb stop casting 301. The vertical position of thumb stop casting 301 is determined by the adjustment of a web shift assembly 304, as explained in detail below in connection with FIG. 3. Translation of control rod 903 so that it nests in slot 925 of plate 310 serves to accurately fix the vertical position of shaft 902, and hence to position the ball vertically with respect to the machine base and the drill carriage, so that the thumb hole will be accurately located on the ball reference plane (in the case of ordinary drilling).

Provision of an accurate span location for the thumb hole is effected by positioning of thumb span cam 935, which controls the angular limit position of thumb span casting 301 on shaft 902, and hence the angle through which the ball may be turned before the face of tapered block 905 strikes the face of stop pad 924 on casting 301. Thumb span cam 935 is angularly positioned by adjustment of "Thumb to No. 1 Finger" control knob 937, which is rigidly connected to cam 935 by shaft 938. The printer of knob 937 may be read against a stationary dial having span dimensions inscribed on it. Rotation of knob 937 also angularly positions gear 942 on shaft 938, as best seen in FIG. 4a, thereby translating rack 943, for a purpose to be described below.

To drill finger holes with proper web and span dimensions, upper and lower arm members 943 and 945 are rotatably mounted on shaft 902 (as best shown in FIGS. 3, 6 and 7), and respectively limited to individual angular positions about shaft 902 by means of upper and lower finger span cams 947 and 949, respectively. Arms 943 and 945 are provided with vertically widened cam pads 980, 981, (FIG. 3) so that cams 947 and 949 (FIGS. 4, 4a, 6, 7) will continue to register with arms 943 and 945 as the arms are moved upwardly and downwardly to accomplish web adjustment, as will be explained presently. Adjustment of "Thumb To No. 2 Finger" span knob 946 rotates span cam 947 via shaft 948, thereby determining the limit angular position of arm member 308, and also rotates dial shield 950. A rotatable sleeve or collar floatably mounted on shaft 948 carries pinion 952 (FIG. 4) which meshes with rack 943 and also rotates dial 953.

Figure 4A:
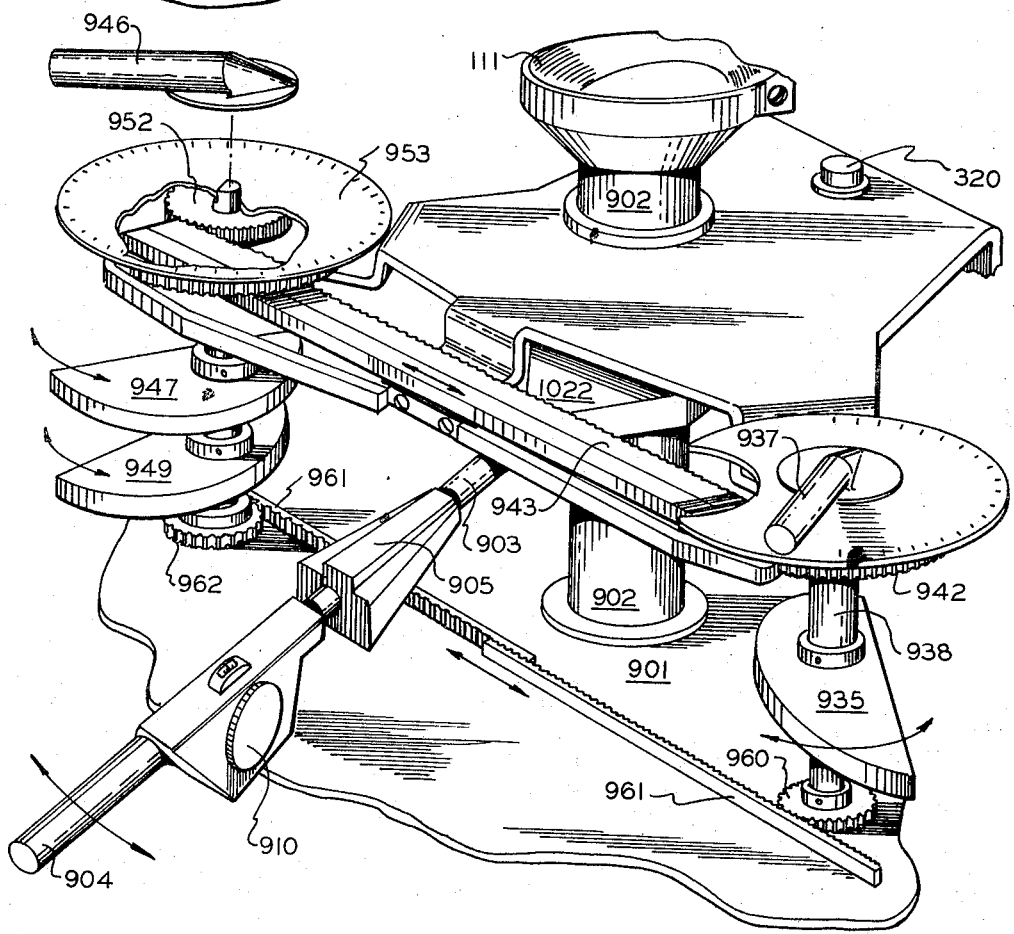
FIG. 4a is a perspective view of a portion of the apparatus of FIG. 4 taken at a different angle.

As shown in FIGS. 4, 4a, and 7, as well as rotating thumb span cam 935, shaft 938 also rotates a further pinion 960, which meshes with a further rack 961, which rotates pinion 962, shaft 963 and lower cam 949, thereby determining the limit angular position of arm member 945, and hence the correct span location of the other finger hole.

In order to provide proper web locations of the finger holes, arms 943 and 945 are adjustable vertically on shaft 902, in a manner to be shown and explained in detail in connection with FIG. 3. Vertically spreading arms 943 and 945 serves to increase the web dimension. When the No. 1, or lower finger hole is to be drilled, control handle 904 and shaft 903 will be moved leftwardly from the reference position shown so that the left and lower faces of cam follower block 905 rest against faces 975 and 976, thereby determining both the angular and vertical positions of shaft 902. When the upper, or No. 2 finger hole is to be drilled, the handle will be moved leftwardly and upwardly, so that the left and upper faces of block 905 rest against faces 977 and 978, thereby determining both the angular and vertical positions of shaft 902 for the No. 2 finger hole.

Because reciprocating block 905 is tapered in a vertical sense, it will be seen that the hole size setting (determining the inward-outward position of block 905 on shaft 903) will affect the limit vertical position of shafts 903 and 902 and the ball whenever block 905 is seated against face 978 to drill the No. 2 finger hole or seated against face 976 to drill the No. 1 finger hole, and thus the vertical translation of the ball to determine the web dimension will be automatically compensated to take finger hole size into account. However, because the vertical position of shafts 902 and 903 is determined solely by slot 925, and not by the upper or lower face of block 905 when the thumb hole is drilled, the thumb hole will be located on a reference line irrespective of thumb hole size. Because block 905 is tapered also in a horizontal sense, it will be seen that hole size setting will affect the limit angular positions of shaft 902 when any of the holes is being drilled, and hence all span settings are automatically compensated or corrected to take hole sizes into account.

Rotation of knob 937 translates rack 943 (FIG. 4), rotating gear 952 and a dial 953, thereby affecting the No. 2 span indication observable through window 950a in dial shield 950 (FIG. 7). Shaft 938 (FIG. 4a) is geared 3:1 to dial 950, by providing gear 942 with three times as many teeth as gear 952. Shaft 938 is geared 1:1 with shaft 963 and cam 949. The adjustment of control knob 937 positions cams 935 and 949 so that the thumb to No. 1 finger hole span dimension projected on the reference axis will be bisected by the ball index mark, and then rotation of knob 946 to the desired "No. 2 Span" setting provides the slightly shorter ring-finger span required by right-handed bowlers or the slightly longer middle finger span required by left-handed bowlers.

The improved web dimension adjustment assembly of the present invention may be better understood by reference to FIG. 3. Main shaft 902, which corresponds in principle to shaft 12 of FIGS. 2a and 2b, is provided on its upper end with the ball clamp 111 (not shown in FIG. 3) and journalled in the machine base to allow both rotation and translation. For sake of clarity most of the fixed machine base structure has been omitted in FIG. 3. As will be explained below, the vertical position of the entire apparatus in FIG. 3 relative to the stationary machine base 901 is governed by engaging a removable pin 324 (not shown in FIG. 3) so that pin 324 registers with a hole 324a in the machine base and a selected one of the holes (321, 322, 323) in shaft 320. Control rod 903, which corresponds to shaft 21 in FIGS. 2a and 2b, is provided with a handle 904 (not shown) on its outer end, and its inner end is fixedly screwed through collar 1022 into main shaft 902, so that movement of the handle 904 enables one to rotate and translate main shaft 902, and the ball support and ball. Thumb stop 301, which corresponds to thumb stop 23 in FIGS. 2a and 2b is rotatably journalled on main shaft 902 and urged angularly about the axis of shaft 902 against the thumb cam 935 (see FIG. 4) to determine the limit of angular rotation of control rod 903 in one direction of rotation about the axis of shaft 902. Thumb stop 301 includes upper and lower arms 301a and 301b, respectively, both of which are slidably journalled on shaft 902, with upper arm 301a just below upper plate section 303 of web shift housing 304 and with lower arm 301b just above lower plate section 305 of the web shift housing 304. Thus it will be seen that vertical adjustment of web shift housing 304 also results in vertical adjustment of thumb stop 301. Because the vertical position of main ball shaft 902 when the thumb hole is being drilled is determined by the vertical position of slot 925 in plate 301 of thumb stop casting 310, it will be seen that the level at which the thumb hole will be drilled will be determined by the vertical position of web shift assembly 304 relative to the machine base 901. Upper finger stop arm 943 is rotatably journalled on shaft 902 and vertically held in position between the upper 309a and lower 309b arms of upper web shift yoke 309, both arms of which also surround main shaft 902. Lower finger stop arm 945 is rotatably journalled on shaft 902 and vertically held in position between the upper 312a and lower 312b arms of lower web shift yoke 312, both arms of which also surround main shaft 902. Like their counterpart finger stops 24 and 25 in the simplified diagram of FIG. 2a, upper and lower finger stop arms 943 and 945 in FIG. 3 are spread vertically apart to increase the limits of vertical translation of control rod 903 and thereby increase the web dimension of the ball finger holes, and moved vertically closer together to decrease the web dimension.

The basic vertical adjustment of the web shift assembly with respect to the machine base, and hence with respect to the drill carriage and drill, is made by vertically adjusting and fixing auxiliary shaft 320 with respect to the machine base 901. Auxiliary shaft 320 is shown provided with a plurality of spaced holes 321, 323, and by means of a removable pin 324 carried in the machine base in hole 324a is inserted in a selected one of the three holes to determine a basic or reference position of shaft 320 and the web shift assembly with respect to the machine base 901. For standard drilling wherein the ball thumb hole is to be located on the ball reference plane, shaft 320 and the entire web shift assembly are vertically positioned with the base-mounted pin in the center hole 322 (not shown) of the three holes registered with hole 324a in the machine base. For a right-hand Collier's grip ball, wherein the lower finger hole is to be located on the ball reference plane, shaft 320 and the web shift assembly are raised and the base-mounted pin is inserted in lower hole 321. For a left-hand Collier's grip ball, wherein the upper finger hole is to be located on the ball reference plane, shaft 320 and the web shift assembly are lowered and the base-mounted pin is inserted in upper hole 323. Once a given one of the three holes is selected, the web shift assembly is left in that vertical position for the entire drilling of the ball.

Pinned or otherwise fixedly attached to auxiliary shaft 320 is block 325, which is threaded to accommodate a first threaded portion 327 of web adjust shaft 328. Web adjust shaft 328 extends vertically below the main mechanism of the machine to a point where knob 329 on its lower end is readily accessible by the operator, inside cabinet 10, FIG. 1. The upper end of web adjust shaft 328 is rotatably carried in upper web shift yoke 309 and snap rings 330, 330 or the like affix yoke 309 to shaft 328, so that vertical translation of shaft 328 results in vertical positioning of yoke 309 and upper finger stop arm 943, and consequently determination of the upper translational limit of main control rod 903, main shaft 902, the ball clamp and the ball. As mentioned above, threaded portion 327 of shaft 328 engages block 325, which is fixedly pinned to shaft 320, and hence it will be seen that rotation of shaft 328 must result in vertical translation of shaft 328, since block 325 is vertically fixed with respect to the machine base by means of the pin in one of holes 321–323. Thus as shaft 328 is rotated, shaft 328 and yoke 309 raise or lower upper finger stop arm 943.

A further larger diameter threaded portion 329a of shaft 328 engages lower yoke 312, and for a reason now to be explained, the pitch of the threads on portion 329a of shaft 328 is twice that of the threads on portion 327. For example, if 24 threads per inch are provided at portion 327, twelve threads per inch are provided at portion 329a. With such an arrangement, it will be seen that a given rotation of shaft 328 will provide twice as much translation of lower yoke 312 with respect to shaft 328 as the translation of shaft 328 itself and upper yoke 309 with respect to block 325, shaft 320 and the machine base. Thus a rotation of shaft 328 which causes shaft 328 and upper yoke 309 to move ¼ inch upwardly with respect to shaft 320 and the machine base, will cause lower yoke 312 to move downwardly ½ inch with respect to shaft 328, which amounts to ¼ inch downward movement with respect to the machine base. Thus it will be seen that by rotation of a single control (shaft 328) in one direction, upper and lower yokes 309 and 312 (and their associated finger stop arms 943 and 945, respectively) will be spread apart with equal amounts of movement, and that by rotation of shaft 328 in the opposite direction they will be moved closer together. It should be noted that irrespective of the rotational adjustment of shaft 328, the centerline between the two yokes will remain at block 325, so that the bisector of the web dimension remains fixed with respect to the base of the machine and the drilling line.

It is possible to obtain similar adjustment of the yokes and finger stops without using two different thread pitches on shaft 328. For example, shaft 328 may be merely slidably journalled in block 325, or block 325 may be omitted, and threads of the same pitch may be used in yokes 309 and 312, with one yoke and its associated portion of shaft 328 threaded right-handed and the other yoke and its associated portion of shaft 328 threaded left-handed. The system shown in FIG. 3 is much preferred over such an alternate arrangement, however, due to the difficulties inherent in assembling and adjusting a device having both left and right-handed threads.

As shown in FIG. 3, the web dimension to which the machine is set may be indicated by indicator means shown as comprising a scale 332 inscribed on shaft 320 against which a line 333 (shown as the edge of knob 329) on shaft 328 may be read. It may be noted that raising or lowering of the entire web shift assembly to drill "Collier's grip" balls has no effect whatever on the web dimension indicated on scale 332, and because the scale accurately indicates the existing web dimension irrespective of the position to which the entire web shift assembly has been bodily adjusted, a single web dimension scale is sufficient for both standard drilling and Collier's grip drilling, thereby obviating the confusion which frequently can result when plural scales must be considered by an unskilled operator.

The use of a pin 324 in hole 324a of the machine base adapted to register with a series of discrete holes in shaft 320 allows only discrete offsetting of the apparatus from the normal drilling arrangement. Additional holes may be provided in shaft 332 to provide as many unbalanced different degrees of offset as desired. It is within the scope of the invention, however, to provide continuous adjustment. Since the amount of offset is determined by the vertical position of shaft 320 (and all of the rest of the apparatus of FIG. 3) relative to the machine base, it will be seen that continuous adjustment may be obtained by any one of a variety of means for temporarily locking shaft 320 in a desired vertical position with respect to the machine base. In FIG. 3a, a simple set screw 381 is provided to lock shaft 320 in a desired position. Shaft 320 is slidably mounted in collar 382 which is rigidly attached to the machine base and which surrounds shaft 320.

In order to drill holes at desired pitch angles, the drill carriage (carrying the motor 162, gear reduction unit 161, drill spindle 172 and drill bit 173) is pivotally mounted to pivot about a vertical axis (Z—Z in FIG. 2a) which is tangent to the surface of a standard diameter bowling ball. As shown in FIG. 4, the entire drill carriage assembly is mounted to pivot about a fixed vertical shaft 121. Drill spindle 172 is carried in a yoke member 407 and also adapted to be pivotally adjusted about a horizontal axis Y—Y defined by pivot 126 in order to provide variations in "side pitch."

Figure 5A:
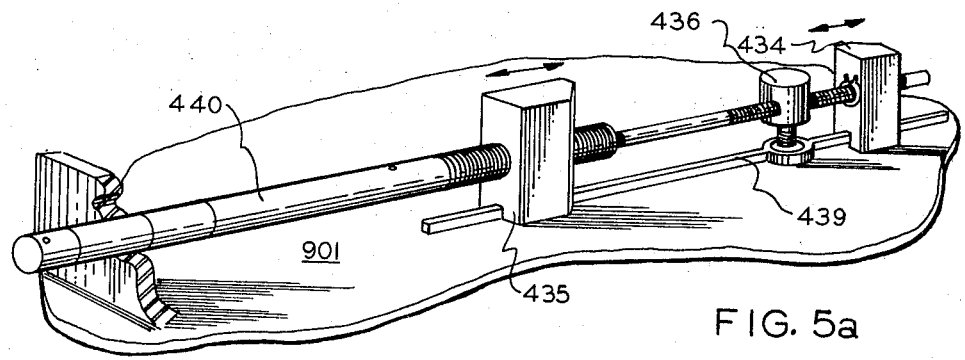
FIG. 5a is a detailed view showing apparatus for adjusting the pitch angle stops of the present invention.

The improved automatic pitch angle adjusting mechanism of the invention may be be understood by reference to FIGS. 5, 5a and 7. The vertical translation of main ball shaft 902 (and ball B) with respect to the machine base 901, and the rotation of shaft 902 (and ball B) by means of control shaft 903 will be recalled from the description above of preceding figures.

A pair of opposing spring means shown as comprising spring-urged rods 937, 939 having ball-shaped ends are arranged to act each between collar 1022, which is rigidly attached to main ball shaft 902, and the stationary walls of the machine base. When shaft 902 is in a centered or reference position, so that the drill bit is pointing approximately at the reference mark on the ball, spring means 937 and 939 are diametrically opposed, but if shaft 902 is rotated a slight amount one way or the other from such a condition of unstable equilibrium, springs 937 and 939 apply a force couple tending to rotate shaft 902 and ball B to one or the other of its angular limit positions. It also will be seen that vertical translation of shaft 902 from the reference zero position shown in FIG. 4 will tend to urge shaft 902 either upwardly or downwardly to a limit position.

In order to determine the forward-reverse pitch angle, or angle of penetration of a hole, the entire drill carriage assembly of FIG. 5 is pivotally mounted to be angularly adjusted about an axis X (FIG. 5) which is tangent to the periphery of a standard-size bowling ball. In FIG. 5, vertically-extending shaft 121 is mounted on base 901 with its axis spaced to be tangent to ball B. A main drill carriage casting 120 includes upper (401) and lower (402) arms journalled on shaft 121, a rearwardly-extending yoke comprising arms 403, 404 in which side pitch shaft 406 is journalled, and a vertically-extending symmetrical yoke which includes base portion 407, and a pair of similar vertically extending arms 409, 410, only arm 409 being visible in FIG. 5.

Drill spindle assembly 172 is pivotally supported at the upper ends of arms 409 and 410 of the upwardly-extending yoke, thereby allowing the spindle to be adjustably rotated about axis Y, to determine the "side pitch" of a hole to be drilled. Drill spindle assembly 172 is connected to be driven by motor 162 through conventional reduction gearing 161, and advancement of the drill bit carried in spindle assembly 172 is accomplished in conventional manner by rotation of crank arms 164. A rigid bracket 411 depending from spindle assembly 172 is provided with a pivotally-mounted nut 414 which engages threaded shaft 415. As side pitch control crank 154 is rotated, threaded shaft 415 is rotated via shaft 406 and a set of bevel gears 418, 419, thereby causing bracket 411, and hence motor 162, gearing 161 and the drill spindle assembly 172 to pivot about axis Y. Side pitch control crank 154 is connected to shaft 406 via a slidable splined coupling 420 and slidably retained in bracket 421 so that shaft 406 slides in and out of coupling 420 as the entire drill carriage assembly pivots about vertical shaft 121.

For automatic adjustment of the drill carriage assembly to provide pitch angle change automatically, collar 1022 is provided with an extending arm portion 430 (FIGS. 5 and 7) which cooperates with a double arm toggle cam 431. Cam 431 is rigidly attached to main drill carriage casting 120 and also arranged to pivot about vertical pitch action shaft 121. Assume for sake of explanation that shaft 902 is centered in its unstable zero angular position and that arm 430 of collar 1022 is centered between arms 431a and 431b of toggle came 431. Now, as control rod 903 is moved rightwardly as viewed in FIG. 5, the direction in which it would be moved to drill the thumb hole, after a slight amount of rotation of main shaft 902, arm 430 will strike arm 431a of toggle cam 431, and then continued rotation of arm 430 will rotate cam 431, and hence the entire drill carriage assembly in a clockwise direction around the axis of shaft 121, thereby swinging the drill carriage in a direction toward the reader as viewed in FIG. 5. As mentioned above, shaft 903 need be only slightly displaced from its unstable centered angular position and then opposing spring means 937 and 939 will urge shaft 902 (and also collar 1022) to a limit angular position. Thus arm 430 will rotate about shaft 902 until a limit angular position is reached, and simultaneously, the entire drill carriage assembly will be pivoted about the axis of shaft 121 until arm 432 of main drill carriage casting 120 strikes stop 434.

Then, after drilling of the thumb hole has been accomplished and the operator moves the control handle so as to move control shaft 903 leftwardly, preparatory to drilling one of the finger holes, arm 430 of collar 1022 eventually strikes arm 431b of toggle cam 431, thereby rotating cam 431, and hence the entire drill carriage assembly, in a counter-clockwise direction about pitch action shaft 121, with the drill carriage assembly rotating until arm 432 of main drill carriage casting 120 strikes adjustable stop 435. Because movement of control handle 904 to position the ball automatically trips toggle cam 431 when the control handle is moved from a thumb hole angular position to a finger hole angular position, or vice versa, the drill carriage automatically is swung to provide a proper pitch angle. Thus the operator is not required to re-adjust the pitch angle setting when changing from thumb-hole drilling to finger-hole drilling, or vice versa, and the danger of an unskilled operator ruining a ball by providing a grossly erroneous pitch angle is minimized.

It will be appreciated from the above explanation that the precise pitch angles which the automatic pitch-changing mechanism selects are determined by the positions of adjustable stops 434 and 435. In order to provide a desired pitch angle for the thumb and finger holes, forward pitch angle control knob 122 is provided. The adjustment of pitch stops 434 and 435 is accomplished by apparatus (best shown in FIG. 5a) which utilizes the same mechanical principles of the web adjustment apparatus explained in detail above in connection with FIG. 3. Just as the rotation of a single control (knob 329) in FIG. 3 served to adjust finger stop arms 943 and 945 equal amounts in opposite directions without displacing the center-line (block 325) between them, rotation of control knob 122 serves to move pitch stops 434 and 435 in opposite directions without displacing the center-line between them. As seen in FIG. 5a, shaft 440, which is rotated by pitch angle control knob 122 (not shown in FIG. 5a) is provided with two threaded sections, one of which has twice the thread pitch of the other. Assume, for example, that pitch control knob 122 is adjusted clockwise in such an amount that pitch stop 435 moves ½ inch leftwardly as viewed in FIG. 5a relative to shaft 440. Because the lesser pitch portion of shaft 440 is threaded through a fixed nut 436 which is fixed relative to the machine base, shaft 440 itself will move in an opposite direction for ¼ inch, and thus pitch stop 434, which is non-threaded and held longitudinally in place on shaft 440 by snap rings, will be moved ¼ inch rightwardly as viewed in FIG. 5a. Thus by operation of a single pitch control knob, both thumb-hole pitch and finger-hole pitch are simultaneously adjusted to be the same amount, in opposite directions with the centerline between stops 434 and 435 removing unchanged relative to the V machine base.

While a great majority of bowling balls are required to be drilled with the same thumb hole pitch as finger hole pitch, an occasional order requires that thumb hole pitch differ from finger hole pitch, and/or that the pitch of one finger hole differ from that of the other finger hole. A further feature of the invention is that while the automatic pitch angle changing mechanism automatically swings the drill carriage assembly to provide the usually required pitch angles, that the drill carriage assembly may be adjusted very easily at any time to provide a different pitch for any given hole merely by adjustment of pitch control 122.

It will be seen that when control handle 904 is moved to rotate main ball 902 about its axis to determine the span dimension, that the drill carriage is automatically adjusted to the desired pitch angle. However, there is no fixed or predetermined relationship between span dimensions and pitch angle, and hence the drill carriage cannot be merely rotated an amount which is a fixed function of the span setting as any fixed gearing would provide. Thus instead of determining the size of the angle through which the drill carriage is rotated, rotation of control handle 904 (and the ball) merely determines the direction in which the drill carriage should be rotated, and the limits to which the drill carriage is rotated are determined by stops 434 and 435. As best seen in FIG. 6 not only is rotation of main shaft 902 affected by opposing spring pair 937, 939, but a further "over-center" compression spring 987 is arranged to act between the machine base 901 and toggle cam 431 on which drill carriage casting 120 is carried. Both collar 1022 (and main shaft 902) and toggle cam 431 are shown in FIG. 6 in their centered unstable equilibrium positions for sake of clarity. It will be seen that as control handle 904 is moved slightly downwardly (clockwise) in FIG. 6, that compression spring pair 937, 939 will urge shaft 902 to rotate in a clockwise direction, until a face of cam block 905 strikes stop 980. However, long before tapered cam block 905 strikes stop 980, arm 430 of collar 1022 will have struck arm 431b of toggle cam 431, displacing cam 431 and the entire drill carriage from its equilibrium position, whereupon spring 987 will force the drill carriage to rotate to the limit position governed by the position of stop 435 on shaft 440 (FIGS. 5 and 5a). When the drill carriage swings counter-clockwise, arm 431b will be seen to swing out of the path of arm 430, so that the limit of rotation of shaft 902 is not governed by the pitch angle limit setting, but so that arm 431a is still capable of being engaged by arm 430 when the control handle (and shaft 902) are later swung in the opposite direction. Thus, even though the required angular rotation of main shaft 902 to establish a desired span dimension has no fixed relation to the desired angular rotation of the drill carriage assembly to provide the desired pitch angle, rotation of control handle 904 to rotate the ball toward the proper angular span stop also automatically initiates rotation of the drill carriage toward the proper pitch angle stop.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. Drilling apparatus, comprising, in combination: a movable workpiece supporting means; a movable powered tool-carriage means; between said supporting means and said tool carriage means, and adjustable stop apparatus for limiting relative movement in two opposite directions, said adjustable stop apparatus including a shaft having first and second threaded portions, said first threaded portion having a thread pitch twice that of said second threaded portion, third threaded means attached to one of the aforesaid means and connected to threadedly engage said second threaded portion, thereby to translate said shaft in a first translational direction as said shaft is rotated in a first angular direction, a first stop means connected to be moved in accordance with translation of said shaft to establish a stop position of said supporting means relative to said tool-carriage means in a given direction, and a second stop means connected to engage said first threaded portion, thereby to translate said second stop means to establish a stop position of said supporting means relative to said tool-carriage means in a direction opposite to said given direction.

2. Drilling apparatus, comprising, in combination: a work-piece supporting means; a drill carriage means including means for advancing a powered drill bit toward a work-piece carried in said supporting means; means for moving said work-piece supporting means between first and second stop positions to position said work-piece relative to said drill carriage means; and control means for determining said first and second stop positions, said control means including a first shaft means having first and second threaded portions, said first threaded portion having a thread pitch twice that of said second threaded portion, means fixed with respect to said drill carriage means connected to threadedly engage said second threaded portion, thereby to translate said first means in a first translational direction as said first shaft means is rotated in a first angular direction, a first stop means connected to be moved in accordance with translation of said first shaft means to establish said first stop position, and a second stop means connected to engage said first threaded portion, thereby to translate said second stop means in a second translational direction opposite to said first translational direction as said first shaft means is rotated in said first angular direction.

3. Bowling ball drilling apparatus, comprising, in combination: a base; a drill carriage pivotally mounted on said base to pivot about a first axis; ball support means mounted on said base for supporting a bowling ball, said ball support means being rotatable about a second axis parallel to said first axis and passing through the center of said ball, said first axis being located so as to be tangent to the periphery of said ball; and means responsive to rotation of said ball support means about said second axis for pivoting said drill carriage about said first axis.

4. Apparatus according to claim 3 in which said means responsive to rotation of said ball support means about said second axis comprises first spring means responsive to rotation of said ball support means from a reference position to tend to rotate said ball support means to an angular limit position; a first member attached to said ball support means and rotatable therewith about said second axis; a second member attached to said drill carriage and rotatable therewith about said first axis, said first member being adapted upon rotation of said ball support means from said reference position to displace said second member, and second spring means responsive to rotation of said drill carriage from a reference position to tend to rotate said drill carriage to an angular limit position.

5. Apparatus according to claim 4 including a pair of stop means for limiting rotation of said drill carriage in opposite directions about said first axis, and control means for simultaneously adjusting said pair of stop means.

6. Apparatus according to claim 4 in which said ball support means is also translatable along said second axis and in which said first spring means are responsive to translation of said ball support means from a reference translational position to tend to translate said ball support means to a translational limit position; a pair of stop means for limiting translation of said ball support means in opposite directions along said second axis, and control means for simultaneously adjusting said pair of stop means.

7. Bowling ball drilling apparatus, comprising, in combination: a base; a drill carriage pivotally mounted on said base to pivot about a first axis; ball support means mounted on said base for supporting a bowling ball, said ball support means being rotatable about a second axis parallel to said first axis and passing through the center of said ball, said first axis being located so as to be tangent to the periphery of said ball; means for relatively displacing said drill carriage and said ball support means in a first direction parallel to said first and second axes; and adjustable stop means for limiting said relative displacement of said drill carriage and said ball support means, said adjustable stop means including a first member relatively adjustable with respect to said base, a shaft having first and second threaded portions, said first threaded portion having a thread pitch twice that of said second threaded portion, said first member being connected to engage said second threaded portion, thereby to translate said shaft as said shaft is rotated, a first stop means connected to be positioned in accordance with translation of said shaft, and a second stop means connected to engage said first threaded portion, whereby said first and second stop means are moved equal amounts in opposite directions as said shaft is rotated and whereby the center-line between said first and second stop means remains at a fixed position relative to said base as said shaft is rotated.

8. Drilling apparatus, comprising, in combination: a base; a tool carriage mounted on said base; a work-piece supporting means movable in first and second opposite directions relative to said base and said supporting means; first and second adjustable stop means for limiting movement of said supporting means respectively in said first and second directions; and an adjusting means for simultaneously adjusting said first and second stop means equal amounts in opposite directions with respect to said base and said tool carriage, said adjusting means comprising a shaft having first and second threaded portions, said first threaded portion having a thread pitch twice that of said second threaded portion, means fixed with respect to said base for threadedly receiving said second threaded portion of said shaft, thereby to translate said shaft at a first rate as said shaft is rotated, said first stop means being connected to be translated in accordance with the translation of said shaft means, said second stop means being connected to said first threaded portion of said shaft to be translated relative to said shaft at a second rate which is double said first rate as said shaft is rotated.

9. Drilling apparatus, comprising, in combination: a base; a work-piece supporting means rotatably mounted on said base; a tool supporting means rotatably mounted on said base; first adjustable stop means for determining the limits of rotation of said work-piece supporting means; second adjustable stop means for determining the limits of rotation of said tool supporting means; means operable upon rotation of said work-piece supporting means in either direction from a first angular reference position for urging said work-piece supporting means toward a limit angular position determined by said first adjustable stop means; means operable upon rotation of said tool supporting means from a second angular reference position for urging said tool supporting means toward a limit angular position determined by said second adjustable stop means; and means interconnecting said supporting means so that angular displacement of one of said supporting means through its reference position automatically rotates the other of said supporting means through its reference position.

10. Apparatus according to claim 9 in which said means interconnecting said supporting means comprises toggle cam means.

11. Adjustable stop means for limiting the movement of a movable device in two opposite directions without displacing the center point between the two opposite limits of movement established by said means, comprising, in combination: a base; shaft means having first and second threaded portions, said first threaded portion having a thread pitch twice that of said second portion; means carried on said base for threadedly engaging said second threaded portion; a first stop connected to be translated by translation of said shaft means; and a second stop threadedly engaging said first threaded portion.

12. Apparatus according to claim 11 having indicator means for indicating the amount of translation of said shaft means.

References Cited by the Examiner

UNITED STATES PATENTS

| 374,730 | 12/1887 | Bullis | 144—84 |
| 955,834 | 4/1910 | Faust et al. | 144—69 |

FRANCIS S. HUSAR, *Primary Examiner.*